E. WIENER.
PROCESS FOR STERILIZING MILK AND MILK PRODUCTS.
APPLICATION FILED SEPT. 12, 1910.
1,006,992.
Patented Oct. 24, 1911.
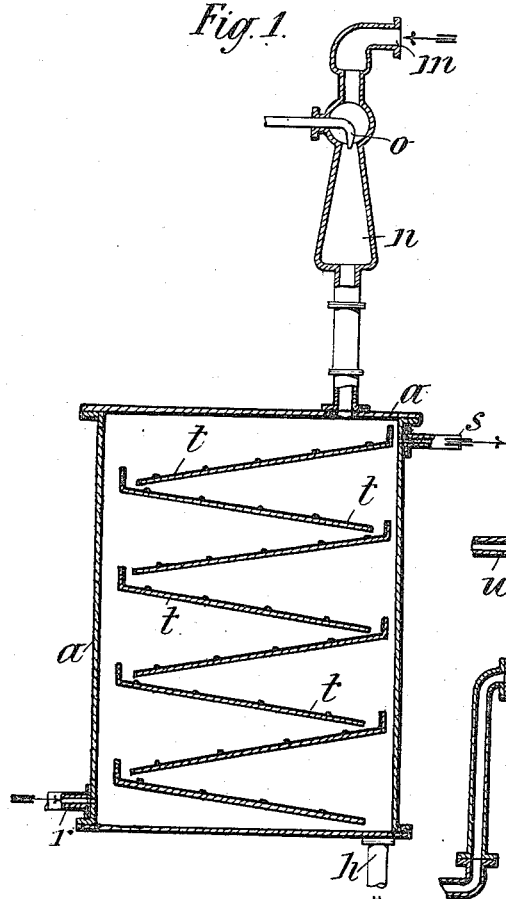
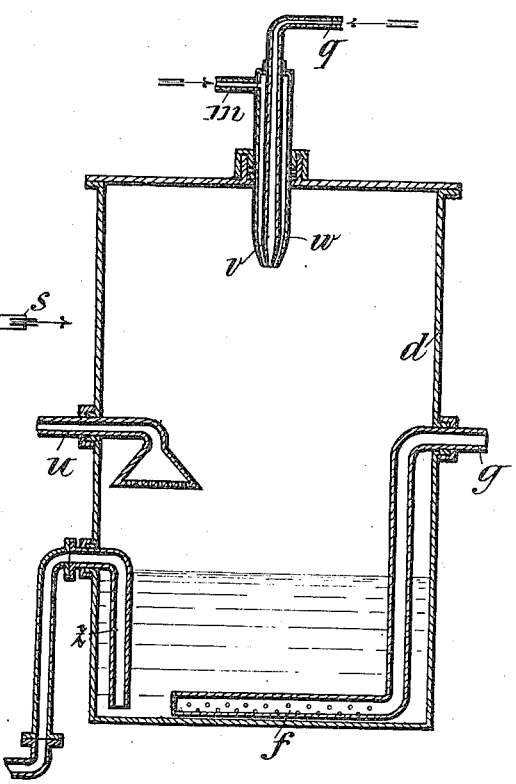
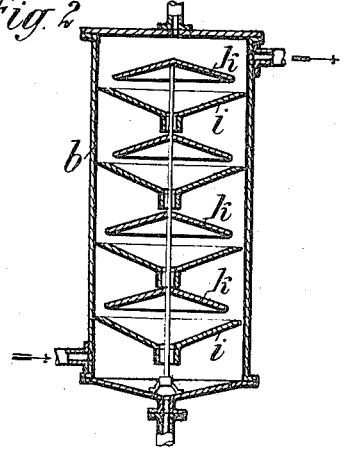

UNITED STATES PATENT OFFICE.

EMIL WIENER, OF VIENNA, AUSTRIA-HUNGARY.

PROCESS FOR STERILIZING MILK AND MILK PRODUCTS.

1,006,992.  Specification of Letters Patent.  Patented Oct. 24, 1911.

Application filed September 12, 1910. Serial No. 581,615.

*To all whom it may concern:*

Be it known that I, EMIL WIENER, doctor of medicine, subject of the Emperor of Austria-Hungary, residing at Vienna, in the Empire of Austria-Hungary, have invented certain new and useful Improvements in the Process for Sterilizing Milk and Milk Products, of which the following is a specification, reference being had therein to the accompanying drawing.

The sterilization of liquids and in particular of milk by the employment of ozone or ozonized air is already known; in accordance with the methods heretofore known the milk or other liquids to be sterilized are treated either by conducting them into a sieve and filling the chamber into which the drops or jets fall with ozonized air, or, ozonized oxygen is emulsified with the liquid to be atomized and conducted with an excess of ozone into bottles. These hitherto known processes do not give the desired results more particularly as regards the special purposes of sterilizing milk because, as experiments have demonstrated, an effective sterilization of the milk by ozone, while simultaneously avoiding any destruction of the organic constituents, can only be effected when the milk is exposed to the ozone in a very finely divided state and provided also that this action is restricted to a short period, and further no ozone must remain in the liquid.

The process forming the object of the present invention is based upon the knowledge referred to above that the milk subjected to the action of the ozonizing air in an extremely finely divided or atomized condition must, if the good properties of the milk are not to be endangered, be only subjected to this action for a short time and this reaction must also be followed by an aerating process by means of which the particles of ozonized air remaining in the milk are eliminated and any alterations in the taste and smell experienced by the milk during the ozonizing removed.

As regards the aerating process it may be mentioned that it is already known to free milk sterilized by the boiling process from the taste of boiling which it acquires by aerating it with sterilized air; it is, however, novel to combine this aerating process with the ozonizing process and thereby eliminate the ozonizing taste from the milk and simultaneously to prevent ozonized air particles from remaining in the milk.

Figures 1 and 3 of the accompanying drawing illustrate two forms of apparatus suitable for effecting the sterilizing and deodorizing processes in accordance with the invention. Fig. 2 shows a modified form of a part of the apparatus.

In the form of apparatus illustrated in Fig. 1 the milk is sprayed under pressure through the spraying nozzle *o* into a conically flaring chamber *n* thereby drawing in with it the ozonized air supplied through the socket *m*. By the action of the ozone on the finely divided milk the latter is sterilized and then flows over the trickling surfaces *t* arranged in a second vessel *a;* upon these surfaces it comes into intimate contact with the sterilized fresh air blown-in in counter current through the conduit *r* or drawn in through the conduits *s* thus causing it to lose the foreign flavor acquired through the ozonizing whereupon it flows off in a deodorized condition through the socket *h*.

The flow of the ozonized air to the sterilizing chamber *n* can be produced by any suitable mechanical means, such for example as by a special suction or forcing apparatus, instead of by the suction effect of the spraying nozzle *o*. The contact of the milk with the sterilized air can also be effected by running the milk through the vessel *b* shown in Fig. 2, in which a large number of collecting and overflow plates *i k* are arranged, the sterilized milk flowing over them in thin layers while the sterilized air is drawn or forced through the vessel *b* in the same or the opposite direction.

Instead of drawing the ozonized air through the milk under pressure as in the method of operating described above, the arrangement may be inverted by drawing the milk through the ozonized air supplied under pressure by means of the atomizing nozzle. Or again both the ozonized air and the milk to be sterilized can be supplied to the mixing and pulverizing nozzle under pressure. This arrangement, in which the suction and atomizing of the milk are effected by the suction effect of the jet of compressed air surrounding the mixing nozzle, presents the advantage that the mixing of the jet of milk with the ozonized air is rendered extremely intimate and efficacious. The aeration following the ozonizing can also be effected in the sterilizing vessel in the following manner: The sterilized air is blown through the liquid accumulating on the bottom of the vessel and continually passing off through an overflow or siphon, after which it leaves the ozonizing vessel together with the ozonized air through a flue arranged above the level of the liquid.

In Fig. 3 an apparatus enabling this modification of the process to be carried out is illustrated diagrammatically in section. The whole of the operation here takes place in the vessel $d$ which is normally closed and through the walls of which a number of tubular conduits pass; the ozonized air under pressure is conducted through the conduit to the nozzle $w$ and draws in with it the milk which is supplied through the conduit $q$ to the interior of the nozzle $v$ and this milk either in the nozzle itself or by means of suitable atomizing appliances of a known kind arranged in front of the nozzle is atomized so as to form a mist the fine bubbles of which are subjected to the action of the ozonized air. The liquid which reforms by the assemblage of the mist bubbles collects in the lower part of the vessel $d$ and is conducted away through a suitably arranged siphon $z$ in such a manner that it is maintained at an approximately constant level in the reservoir $d$. A perforated tube $f$ is arranged at the bottom of the vessel $d$ and connects with a conduit $g$ supplying sterilized air; through its perforations sterilized air is forced in a number of small jets through the milk which is maintained at a certain level. By this means the milk is deodorized and any ozonized particles of air remaining in it are carried off so that their continued action upon the milk is avoided. The sterilized air then passes out of the vessel $d$ together with the ozonized air through an outlet pipe $u$ arranged above the level of the liquid.

The milk thus treated presents only a fraction of the number of bacteria originally contained in it and is characterized in particular by the absence of all pathogenic bacteria (in particular tubercular bacilli) and also by its almost completely natural taste.

The process can of course also be utilized for creams of greater or less density and also for milk by-products.

Having now particularly described and ascertained the nature of my said invention and in what manner the same is to be performed, I declare that what I claim is:

1. The process for sterilizing milk and cream by ozone, which consists in exposing the liquid to the ozonized air in an atomized form and then subjecting the same to an aerating process and removing the ozonizing taste and simultaneously preventing any particles of the ozonized air from remaining in the liquid.

2. The process for sterilizing milk or cream by ozone, which consists in exposing the liquid to the ozonized air in an atomized form and then subjecting the same to an aerating process and removing the ozonizing taste and simultaneously preventing any particles of the ozonized air from remaining in the liquid, the sterilizing and deodorizing of the liquid taking place in the same vessel.

3. The process for sterilizing milk and cream by ozone, which consists in exposing the liquid to the ozonized air in an atomized form and then subjecting the same to an aerating process and removing the ozonizing taste and simultaneously preventing any particles of the ozonized air from remaining in the liquid, the sterilizing and deodorizing of the liquid taking place in the same vessel, conducting the sterilized air in jets through the liquid collecting in the lower part of the ozonizing vessel and conducting away the ozonized and sterilized air from a point above the level of the liquid in said vessel.

In testimony whereof I hereunto affix my signature in presence of two witnesses.

EMIL WIENER.

Witnesses:
 FRIEDRICH BINDEI,
 AUGUST FUGGER.